United States Patent
Korcz et al.

(10) Patent No.: US 12,444,916 B2
(45) Date of Patent: *Oct. 14, 2025

(54) PROTECTIVE OUTLET COVER

(71) Applicant: Hubbell Incorporated, Shelton, CT (US)

(72) Inventors: Krzysztof Korcz, Granger, IN (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,525

(22) Filed: Jul. 26, 2023

(65) Prior Publication Data

US 2023/0378732 A1    Nov. 23, 2023

Related U.S. Application Data

(63) Continuation of application No. 16/914,936, filed on Jun. 29, 2020, now Pat. No. 11,742,644.

(60) Provisional application No. 62/868,388, filed on Jun. 28, 2019.

(51) Int. Cl.
*H02G 3/08* (2006.01)
*H02G 3/14* (2006.01)

(52) U.S. Cl.
CPC ............... *H02G 3/088* (2013.01); *H02G 3/14* (2013.01)

(58) Field of Classification Search
CPC ............ H02G 3/088; H02G 3/14; H02G 3/12; H02G 1/00
See application file for complete search history.

(56) References Cited

U.S. PATENT DOCUMENTS

| | | | | |
|---|---|---|---|---|
| 3,745,664 A | * | 7/1973 | Altseimer | H02G 3/14 D10/64 |
| 5,195,901 A | * | 3/1993 | Correnti | H01R 13/447 174/67 |
| 5,562,222 A | * | 10/1996 | Jordan | H02G 3/14 220/800 |
| 5,981,875 A | | 11/1999 | Kesler et al. | |
| 6,103,974 A | * | 8/2000 | Erdfarb | B05B 12/20 174/67 |
| 6,420,654 B1 | * | 7/2002 | Shotey | H02G 3/14 174/67 |
| 6,520,363 B1 | * | 2/2003 | Sullivan | H01R 13/447 220/241 |
| 6,570,091 B1 | | 5/2003 | Kesler et al. | |
| 6,653,566 B2 | | 11/2003 | Petak et al. | |

(Continued)

OTHER PUBLICATIONS

International Search Report and Written Opinion issued on Dec. 2, 2020, by the International Searching Authority in corresponding International Patent Application No. PCT/US2020/040088. (14 pages).

*Primary Examiner* — Rexford N Barnie
*Assistant Examiner* — Michael J Warmflash
(74) *Attorney, Agent, or Firm* — Robinson + Cole LLP

(57) ABSTRACT

A protective cover for an electrical device for use during construction includes a front wall, a pair of end walls, and a pair of side walls. The end walls extend from opposite sides of the front wall. The side walls extend from opposite sides of the front wall. The front wall, the end walls, and the side walls define a cavity configured to enclose an electrical device. The cover can be placed over the device during construction to limit the ingress of debris.

20 Claims, 11 Drawing Sheets

(56) References Cited

U.S. PATENT DOCUMENTS

| | | | |
|---|---|---|---|
| 6,894,223 B1 | 5/2005 | Shotey et al. | |
| 7,838,769 B2 | 11/2010 | Peck | |
| 8,258,401 B1 | 9/2012 | Shotey et al. | |
| 8,314,334 B1 | 11/2012 | Cleghorn et al. | |
| 8,569,620 B1 | 10/2013 | Baldwin | |
| 9,553,438 B2 * | 1/2017 | Korcz | H02G 3/14 |
| 2002/0112873 A1 | 8/2002 | Shotey et al. | |
| 2003/0141092 A1 * | 7/2003 | Petak | H02G 3/12 174/66 |
| 2003/0213801 A1 * | 11/2003 | Bradley | H02G 3/121 220/241 |
| 2007/0045308 A1 | 3/2007 | Lalancette et al. | |
| 2008/0223601 A1 | 9/2008 | Johnson | |
| 2008/0236859 A1 * | 10/2008 | de la Borbolla | H02G 3/14 174/66 |
| 2008/0236860 A1 * | 10/2008 | Howe | B05B 12/20 174/67 |
| 2009/0173513 A1 | 7/2009 | Petak | |
| 2010/0108374 A1 | 5/2010 | Korcz et al. | |
| 2011/0005800 A1 | 1/2011 | Magno, Jr. | |
| 2011/0261511 A1 | 10/2011 | Alderson et al. | |
| 2012/0111597 A1 | 5/2012 | Korcz et al. | |
| 2014/0179171 A1 | 6/2014 | Mortun et al. | |
| 2015/0041467 A1 | 2/2015 | Thomas et al. | |
| 2016/0141850 A1 | 5/2016 | Zbriger et al. | |
| 2016/0172831 A1 * | 6/2016 | Korcz | H02G 3/185 174/57 |
| 2016/0268071 A1 | 9/2016 | Thomas et al. | |
| 2020/0106249 A1 | 4/2020 | Audell | |

\* cited by examiner

PROTECTIVE OUTLET COVER

RELATED APPLICATIONS

This application is a continuation of U.S. application Ser. No. 16/914,936, filed Jun. 29, 2020, which is based on U.S. Provisional Application Ser. No. 62/868,388, filed Jun. 28, 2019, the disclosures of which is incorporated herein by reference in its entirety and to which priority is claimed.

FIELD

Various exemplary embodiments relate to protective covers for outlets used during construction, such as during plastering or hanging drywall.

BACKGROUND

During construction, electrical devices such as, but not limited to, electrical outlets, switches, and others are typically connected to a gang or junction box installed in a wall or ceiling. The gang or junction box is initially secured to a stud or support beam inside of the wall or ceiling. Plaster rings, extension rings, or extenders, commonly known as mud rings, when used, are attached to the junction box prior to the installation of sheet rock, wall board, or other covering surface material.

After the installation of the surface material, a hole is formed in the surface material to expose the junction box. Sometimes, a cover is used over the junction box to prevent surface material from entering the junction box and to prevent damage of any wires positioned in the junction box. The electrical device is then secured in the box in electrical communication with one or more electrical conductors so that the electrical device extends or protrudes from the wall or ceiling. A finishing plate can then be positioned over the electrical device, for example an outlet or switch wall plate.

SUMMARY

According to certain aspects, a protective cover for an electrical device for use during construction includes a front wall, a pair of end walls, and a pair of side walls. The end walls extend from opposite sides of the front wall and include an outwardly extending protrusion. The side walls extend from opposite sides of the front wall and include a resilient tab. The front wall, the end walls, and the side walls define a cavity configured to enclose an electrical device. The end wall protrusion is configured to enclose a portion of a mounting strap of the electrical device.

According to certain aspects, a protective cover and mud ring assembly for an electrical device for use during construction includes a protective cover having a front wall, a pair of end walls extending from opposite sides of the front wall, a pair of side walls extending from opposite sides of the front wall, and a tab extending from each of the side walls. A mud ring includes a base plate and a ring extending from the base plate, the ring having an outer wall. The mud ring is configured to receive an electrical device. The protective cover is configured to connect to the mud ring and enclose the electrical device. When the protective cover is connected to the mud ring the tabs extend between the outer wall and the electrical device.

According to certain aspects, a protective cover for an electrical device for use during construction includes a front wall having a plurality of knockouts configured to be selectively removed to form openings in the front wall. A pair of end walls extend from opposite sides of the front wall. A pair of side walls extend from opposite sides of the front wall. The front wall, the end walls, and the side walls define a cavity configured to enclose an electrical device. The knockouts are configured to align with fastener openings on respective electrical devices.

Certain aspects include a method of enclosing an electrical device during a construction operation. A protective cover is associated with an electrical device. The protective cover has a front wall including a plurality of knockouts, a pair of end walls extending from opposite sides of the front wall, and a pair of side walls extending from opposite sides of the front wall. The front wall, end walls, and side walls defining a cavity to enclose an electrical device. One or more of the knockouts are removed based on the associated electrical device to form one or more openings in the front wall configured to align with a fastener opening of the associated electrical device. A fastener is inserted through the one or more openings and protective cover is secured to the electrical device.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Various exemplary embodiments are directed to protective cover used for installation of outlets during wall construction and rough-in work. Typically, junction boxes and the associated wiring are installed and then surface material is placed over the junction boxes. Holes are then formed in the surface material to expose the junction boxes. These holes can be formed using a rotary tool (e.g., Dremel, cut-out saw, spiral saw, router) with an attached bit. Once the junction boxes are exposed, the electrical devices (e.g. outlets, switches, etc.) can be installed. This procedure often requires an electrician to make multiple trips to a job site. The present disclosure is directed to a protective cover that can be placed over an outlet that is installed in a junction box.

Figure 1:
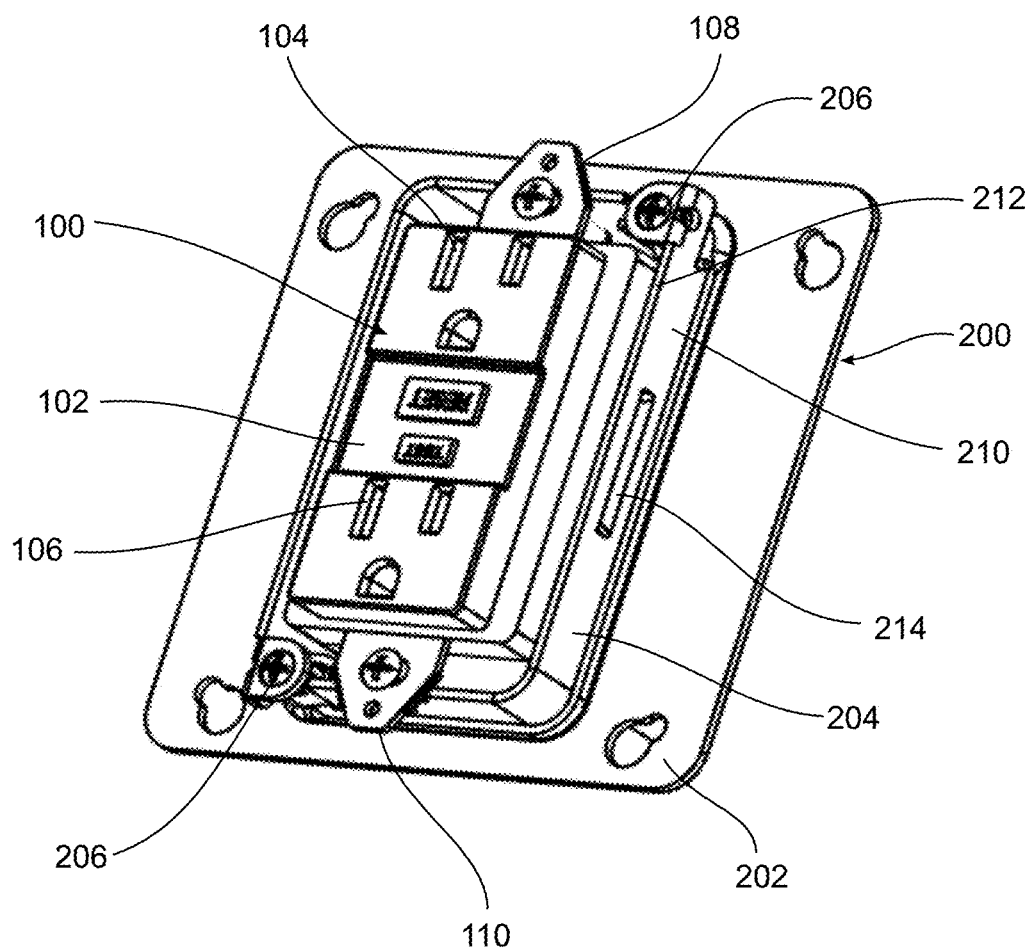
FIG. 1 is a perspective view of an outlet connected to a mud ring.
Figure 2:
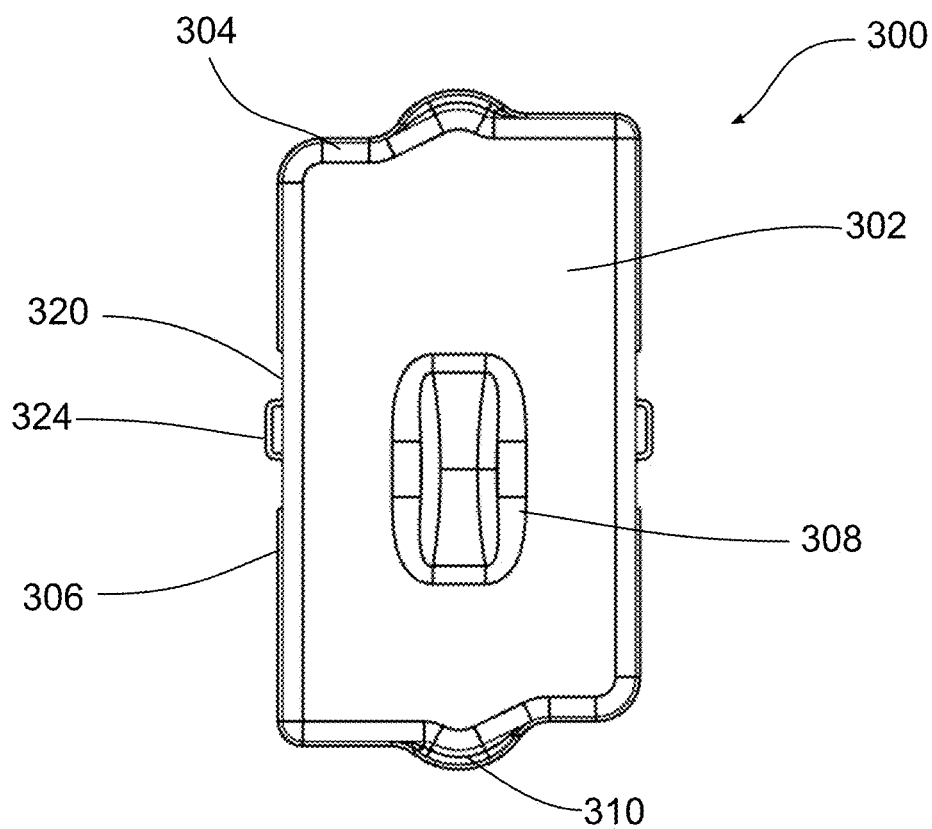
FIG. 2 is a front view of a single-gang protective cover.

FIG. 1 shows an electrical device, illustrated as a single-gang, ground-fault current interrupter (GFCI) outlet 100. The outlet 100 includes a body 102 having an upper set of receptacle openings 104 and a lower set of receptacle openings 106. A mounting yoke extends through the body and terminates at each end with an upper mounting strap 108 and a lower mounting strap 110.

The outlet 100 is connected to a mud ring assembly 200. The mud ring assembly 200 includes a base plate 202, a movable ring 204, and a pair of indexing screws 206. The base plate 202, and the movable ring 204, each include screw openings that align to receive the indexing screws 206. The mud ring 200 is typically connected to a junction box (not shown). Rotation of the indexing screws 206 can be used to move the movable ring 204 with respect to the base plate 202, for example between a first or retracted position, a second or extended position, and a plurality of intermediate positions. This allows the position of the outlet 100 to be adjusted relative to the junction box, and thus relative to the wall to accommodate different wall depths.

In the illustrated embodiment, the movable ring 204 includes a first ring portion and a second ring portion that are independently formed with each having an outer wall 210 with an upper edge 212. A recess 214 can be formed in an exterior surface of the outer wall 210.

FIGS. 2-5 show an exemplary embodiment of a protective cover 300 that can be used during an installation process. The cover 300 includes a front wall 302, a pair of end walls 304, and a pair of side walls 306 defining a cavity having a substantially rectangular shape configured to fit over, and in some cases at least partially receive, an electrical device (e.g., outlet 100).

The front wall 302 is configured to face toward the wall or other surface and cover the electrical device and close any gaps between the electrical device and the junction box. In the illustrated embodiment the front wall 302 includes a protrusion 308 that is configured to receive a light switch. Accordingly, the cover 300 can be used with both light switches and outlets. Other embodiments can include other surface features to accommodate different sizes and types of electrical devices as needed.

Figure 3:
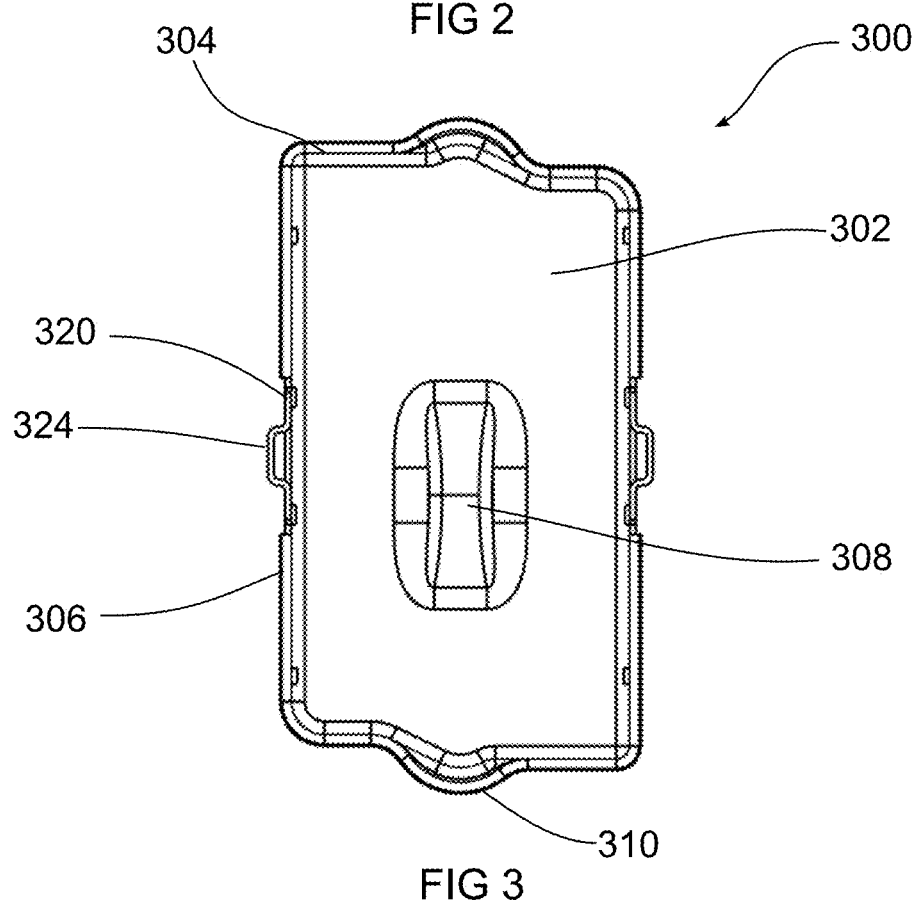
FIG. 3 is a rear view of the protective cover of FIG. 2.
Figure 4:
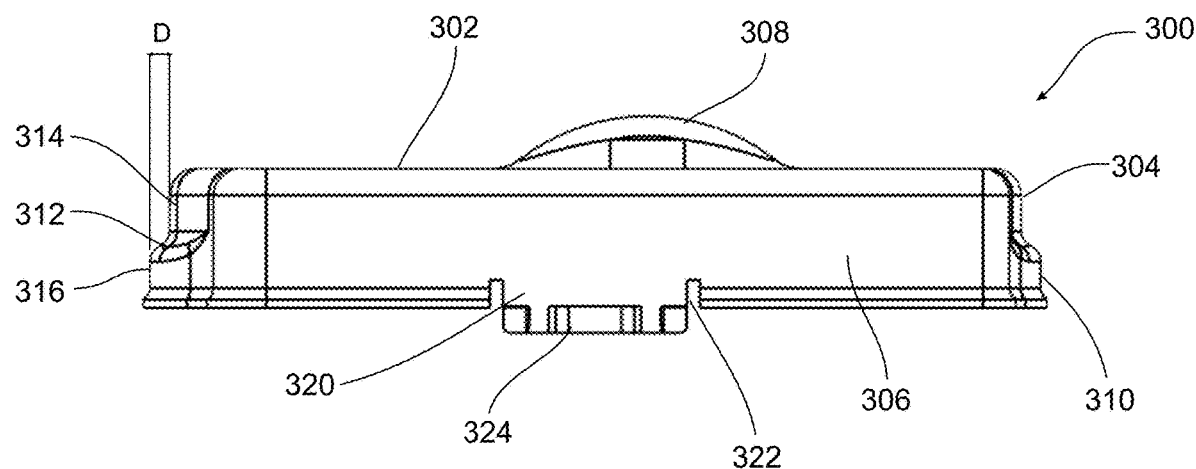
FIG. 4 is a side view of the protective cover of FIG. 2.

As best shown in FIGS. 3 and 4, the end walls 304 each include a curved protrusion 310. The curved protrusions 310 extend from the end walls 304 away from the front wall 302 in a direction parallel to the top or bottom of the electrical device respectively. The curved protrusions 310 are configured to fit over the upper and lower mounting straps 108, 110, respectively.

The curved protrusions 310 can also include a step 312 that extends between an upper portion 314 of the protrusion and a lower portion 316. The step 312 forms a surface that can receive the end of the cutting tool bit to guide the bit along the curved portion. Additionally, the upper portion 314 is offset from the lower portion by a distance D. This distance D can correspond to the diameter of the bit, typically 0.125 inches. This helps to provide an opening that is substantially flush with the mounting straps 108, 110 so that there are no exposed gaps after installation of any wall plate or other covering associated with the electrical device.

Figure 5:
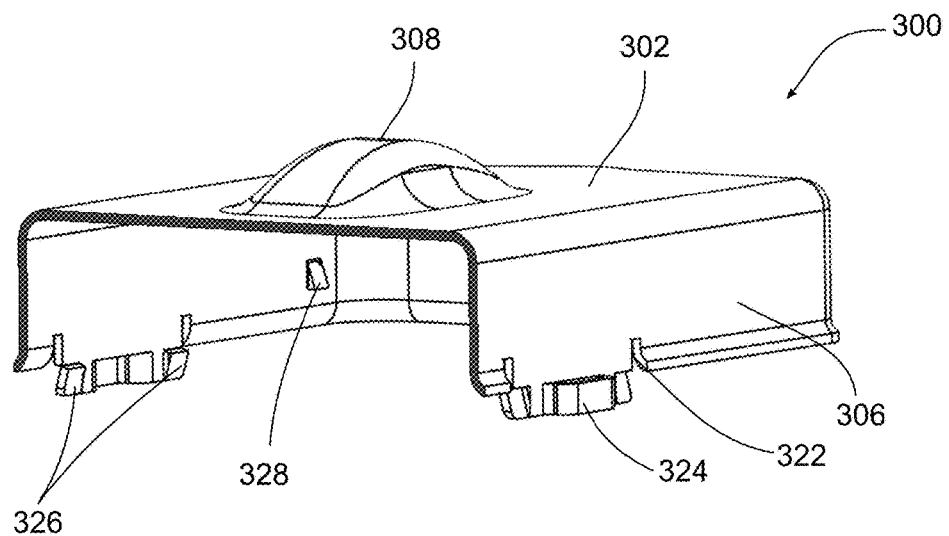
FIG. 5 is a perspective, sectional view of the protective cover of FIG. 2.

As best shown in FIGS. 4 and 5, the side walls 306 each include a resilient tab 320 that is separated from the remainder of the wall 306 by slots 322 on each side. The tab 320 includes a rectangular outer protrusion 324 that extends from an outer surface of the tab 320 away from the cavity. The outer protrusion 324 defines an opening that can receive a tool, such as a screw driver. One or more inner protrusions 326 can extend from an inner surface of the tab 320 toward, or into, the cavity. The inner protrusions 326 can be formed as hooks or other engagement members. The inner protrusions 326 are formed in sets on each tab 320, positioned on opposite sides of the opening defined by the outer portions 324. As best shown in FIG. 5, stop protrusions 328 can also extend from an interior surface of the side walls 306. Although only one stop protrusion 328 is shown, two can be formed on each side wall 306.

Figure 6:
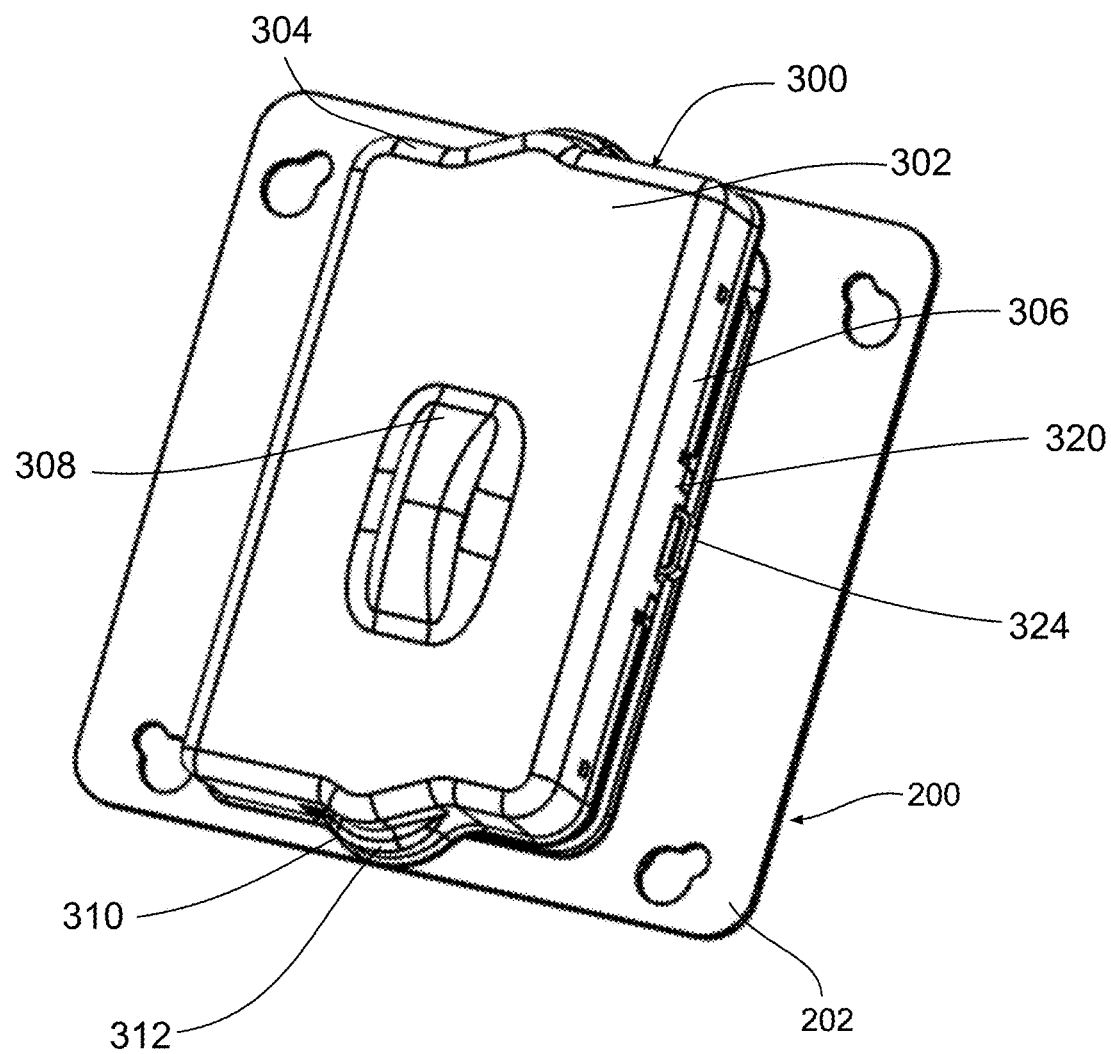
FIG. 6 is a perspective view of the protective cover connected to the mud ring over the outlet.
Figure 7:
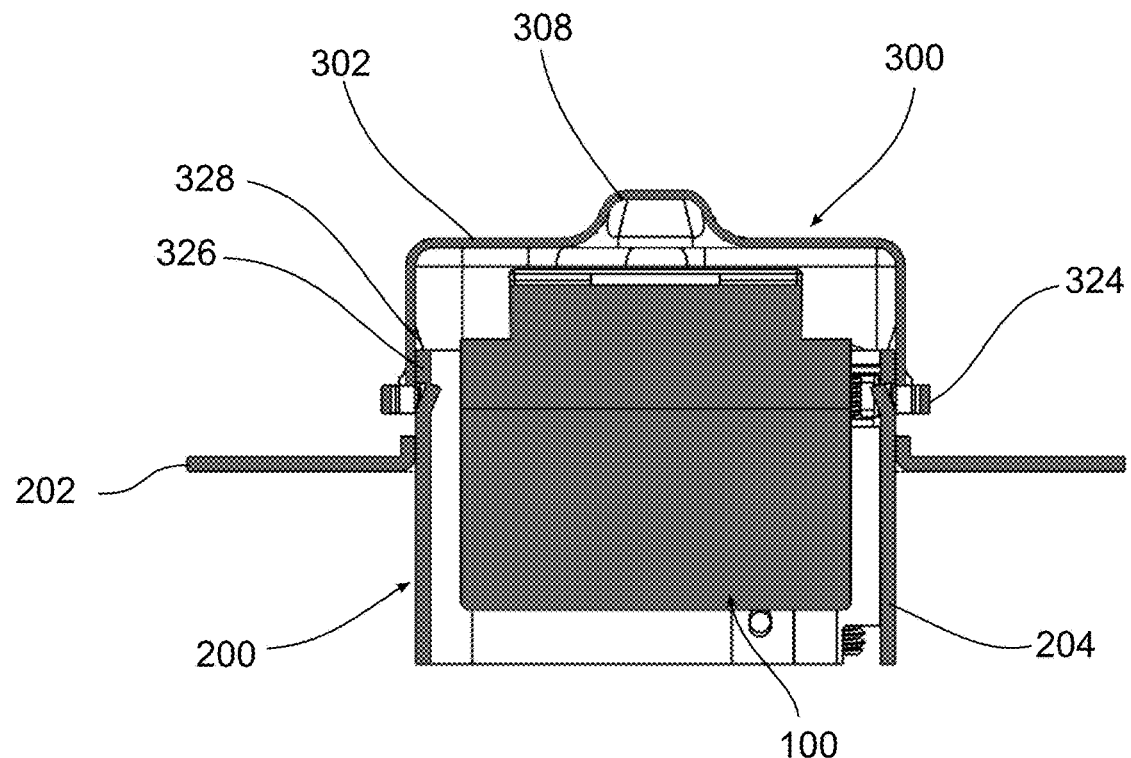
FIG. 7 is a bottom, sectional view of the assembly FIG. 6.
Figure 8:
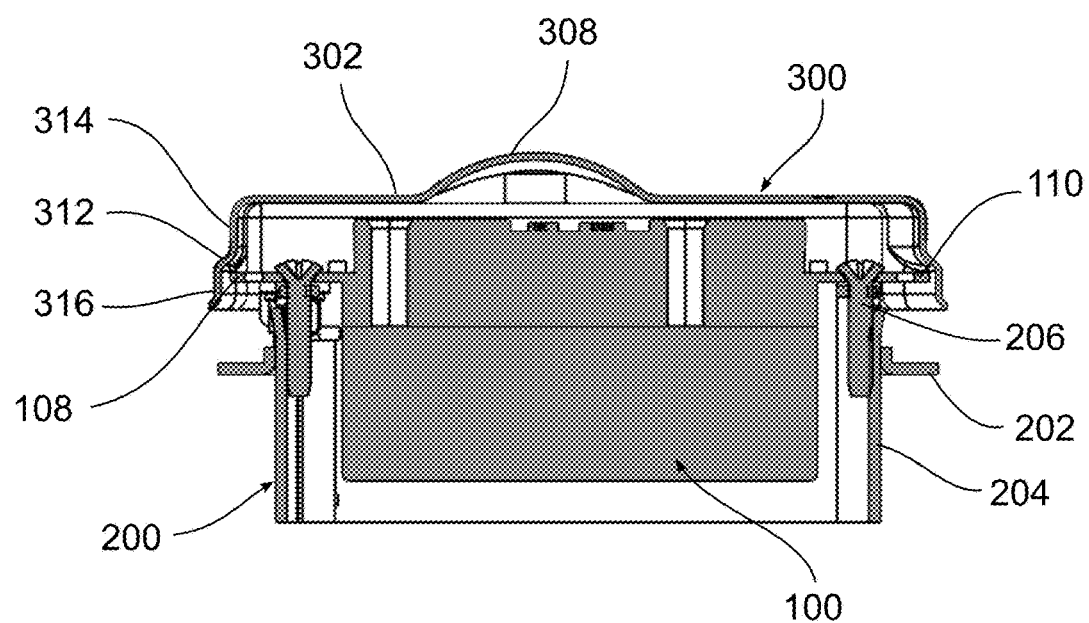
FIG. 8 is a side, sectional view of the assembly of FIG. 6.

As shown in FIGS. 6-8, the cover 300 is placed over the outlet 100 and can be snap-fit to the mud ring 200. The tab 320 is deflected and the interior protrusions 326 snap-fit to the recess 214 formed in the outer wall 210 of the mud ring 200. The stop protrusions 328 engage the upper edge 212 of the outer wall 210. To remove the cover 300, a user can place a tool, for example a flat-head screw driver into the openings formed by the outer protrusions 324 and flex the tab 320 so that the interior protrusions 326 disengage the recess 214.

The cover 300 can also be modified to include other types of connections. For example, other snap-fit connectors can be used to connect the cover 300 to the outlet 100 or the mud ring 200. One or more threaded fasteners can be used to connect the cover 300 to the outlet 100 or mud ring 200. For example, a fastener could connect the cover 300 to the outlet 100 using the standard threaded openings in the yoke (e.g., central openings or outer openings).

Use of the cover 300 allows an outlet 100 to be installed prior to installation of the surface material. This reduces the amount of work that needs to be performed by an electrician and reduces the number of trips the electrician needs to make to a work site. For example, the junction box, outlet 100, and cover 300 can be installed by an electrician in a single trip, prior to installation of the wall panels or other surface material. After the surface material is installed, a non-electrician can cut openings around the outlet using, for example, a dry wall router. The step 312 on the cover 300 forms a surface that can receive the end of the cutting tool bit to guide the bit along the curved portion. This can make it easier to form a cleaner cut around the electrical device, with less of a gap between the surface material and the junction box. The outlet 100 and mud ring 200 are provided as examples, and the protective cover 300 can be used with other types of electrical devices and mud rings.

FIGS. 9-13 show another exemplary embodiment of a single-gang protective cover 400 that can be used during an installation process. The cover 400 includes a front wall 402, a pair of end walls 404, and a pair of side walls 406 defining a cavity having a substantially rectangular shape configured to fit over, and in some cases at least partially receive, an electrical device (e.g., outlet, switch). The front wall 402 is configured to face toward the wall or other surface and cover the electrical device and close any gaps between the electrical device and the junction box.

Figure 9:
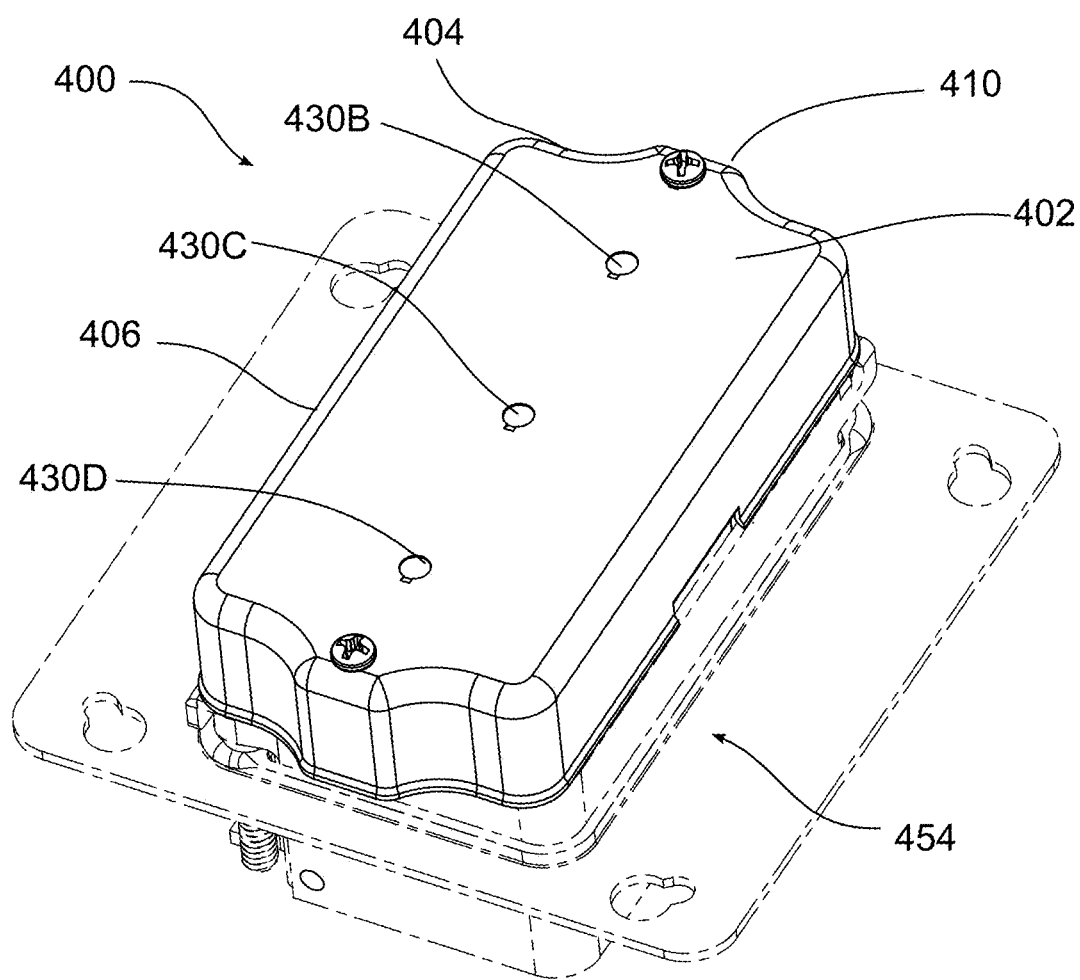
FIG. 9 is a perspective view of a single-gang protective cover connected to a mud ring over an outlet.
Figure 10:
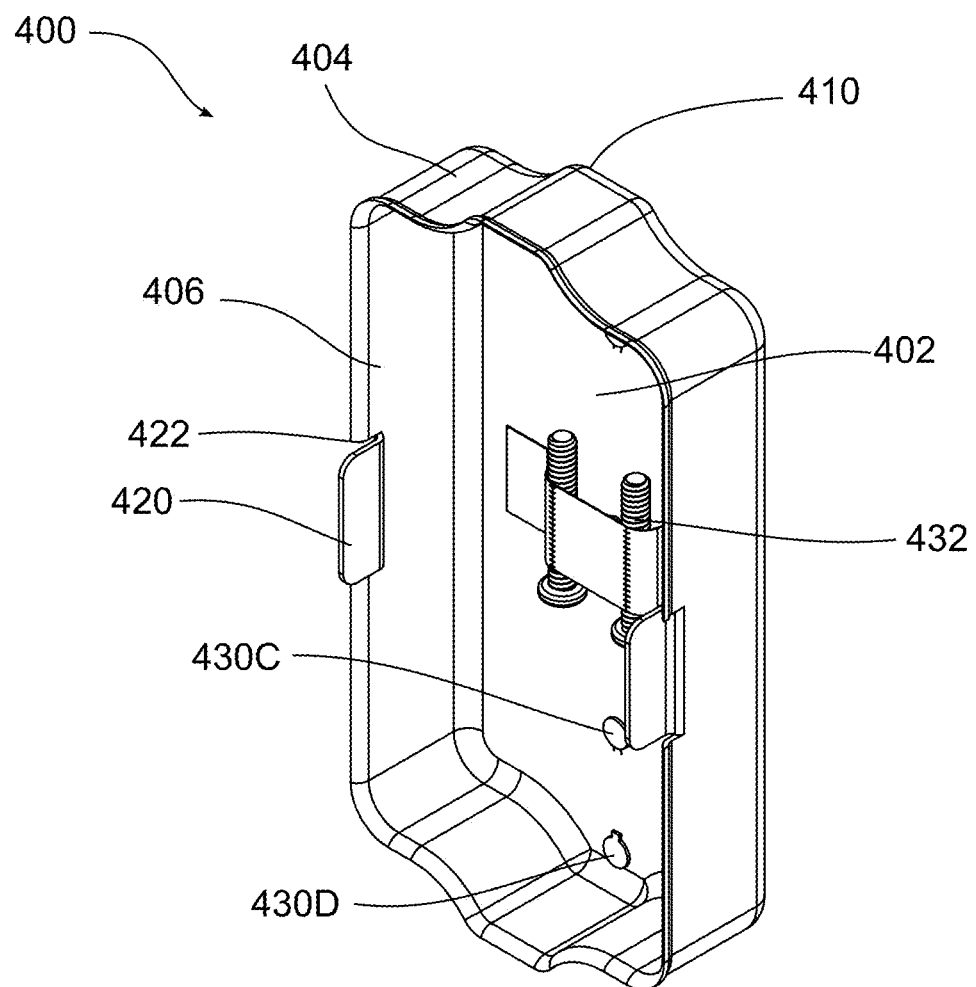
FIG. 10 is a rear perspective view of the cover of FIG. 9.

As best shown in FIGS. 9 and 10, the end walls 404 each include a protrusion 410. The protrusions 410 extend from the end walls 404 away from the front wall 402 in a direction parallel to the top or bottom of the electrical device respectively. The protrusions 410 are configured to fit over the upper and lower mounting straps of an electrical device.

As best shown in FIG. 10, the side walls 406 each include a resilient tab 420 that is separated from the remainder of the wall 406 by slots 422 on each side. The tabs 420 extend from the side walls toward the electrical device and also can include a portion that extends in toward the cavity. The tab 420 can be configured to engage a mud ring or junction box to form a releasable connection when installed.

In the illustrated embodiment the front wall 402 includes a series of knockouts 430A-E that are configured to receive a fastener 432. The number and position of the knockouts 430A-E is configured to align with openings on different electrical devices. The illustrated embodiment shows an upper knockouts 430A, 430B, a central knockout 430C, and lower knockouts 430D, 430E.

The knockouts 430A-E can be removed as needed by an installer and the protective cover 400 can be installed using fasteners 432 (e.g., screws) that can be included with the cover. The remaining knockouts 430A-E can stay in place, allowing the protective cover 400 to cover an electrical in a manner that prevents or reduces ingress of debris (e.g., paint, dust, etc.).

Figures 11, 12:
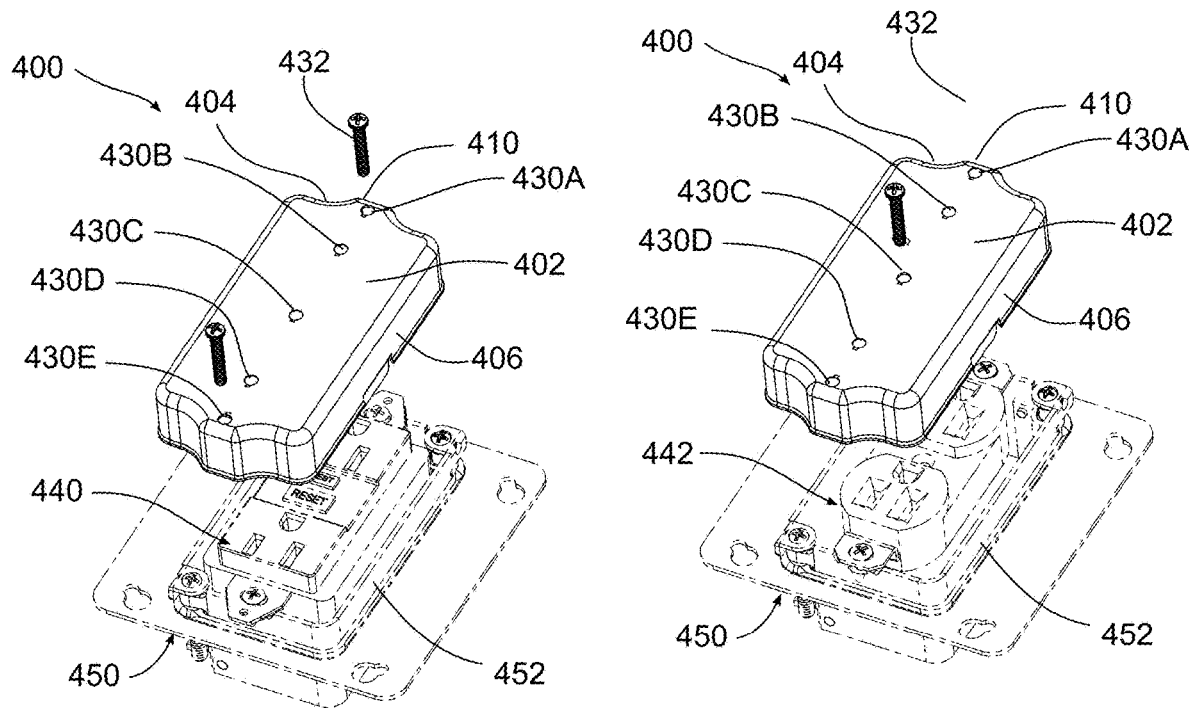
FIG. 11 is a perspective assembly view of the cover of FIG. 9 with a mud ring and a GFCI outlet.
FIG. 12 is a perspective assembly view of the cover of FIG. 9 with a mud ring and a duplex outlet.
Figure 13:
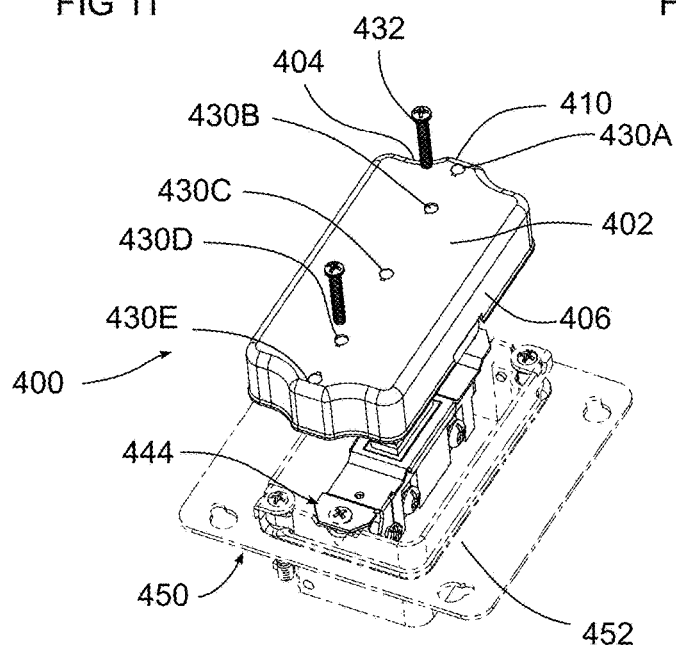
FIG. 13 is a perspective assembly view of the cover of FIG. 9 with a mud ring and a rocker switch.

FIGS. 11-13 show the cover 400 used in connection with different electrical devices, and the use of different knockouts 430A-E accordingly. FIG. 11 shows the use of the cover 400 with a GFCI outlet 440. An upper knockout 430A and a lower knockout 430E are removed to receive the fasteners 432. The fasteners 432 extend through the cover 400 and into openings in the mounting strap of the GFCI outlet 440. FIG. 12 shows the use of the cover 400 with a duplex outlet 442. The central knockout 430C is removed to receive a fastener 432. The fastener extends through the cover 400 and into a central opening in the body of the duplex outlet 442. FIG. 13 shows the use of the cover 400 with a switch 444. An upper knockout 430B and a lower knockout 430D are removed to receive the fasteners 432. The fasteners 432 extend through the cover 400 and into openings in the mounting strap of the switch 444.

Each of the electrical devices 440, 442, 444 is shown connected to an adjustable mud ring 450. When the cover is connected, the tabs 420 will extend into the mud ring 450 between the electrical device and an outer wall 452 of the mud ring 450. The cover 400 is also configured to be used with a regular mud ring 454 shown in FIG. 9.

FIGS. 14-18 show an exemplary embodiment of a double-gang protective cover 500 that can be used during an installation process. The cover 500 includes a front wall 502, a pair of end walls 504, and a pair of side walls 506 defining a cavity having a substantially rectangular shape configured to fit over, and in some cases at least partially receive, an electrical device (e.g., outlet, switch). The front wall 502 is configured to face toward the wall or other surface and cover the electrical device and close any gaps between the electrical device and the junction box.

Figure 14:
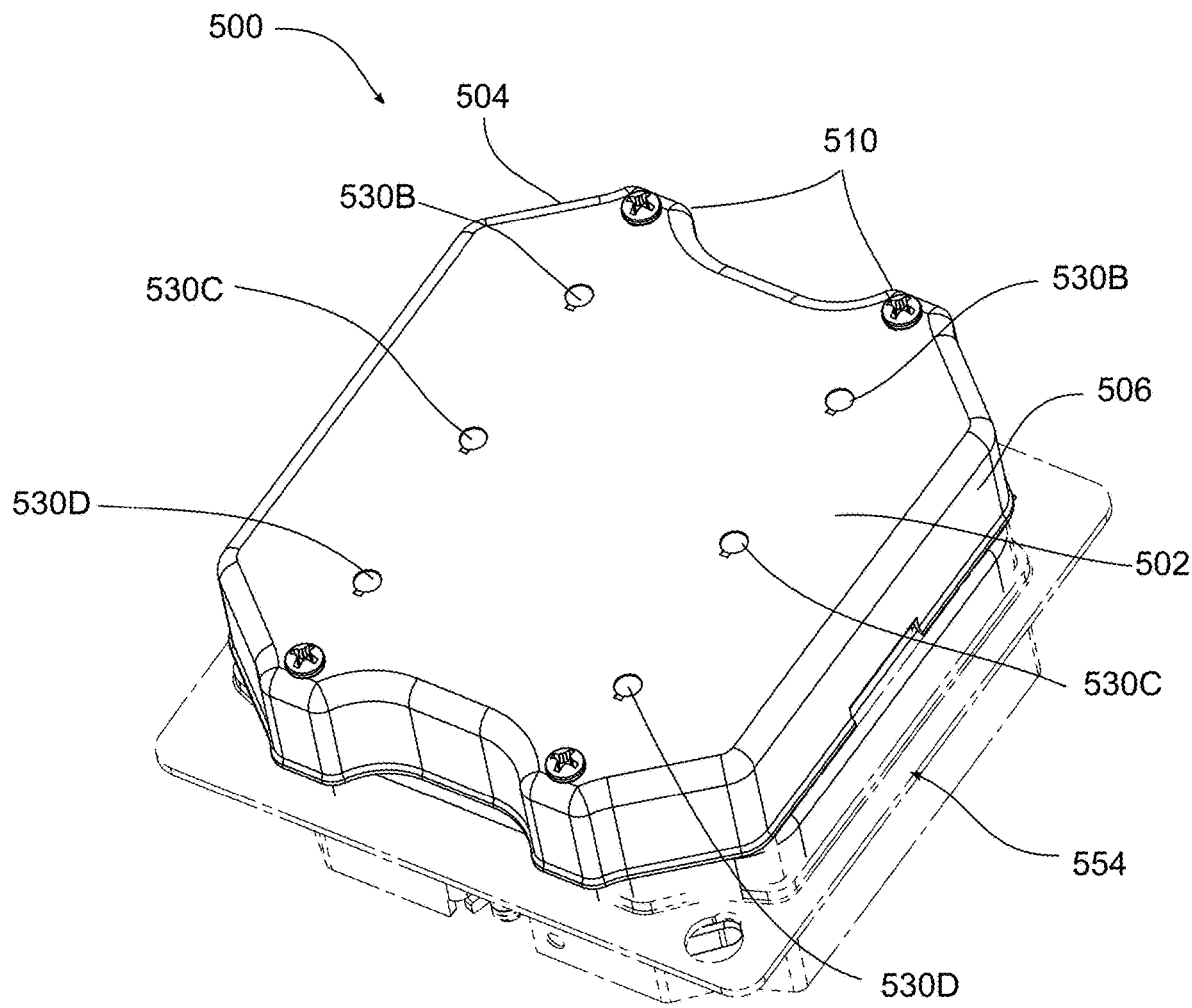
FIG. 14 is a perspective view of a two-gang protective cover connected to a mud ring over an outlet.
Figure 15:
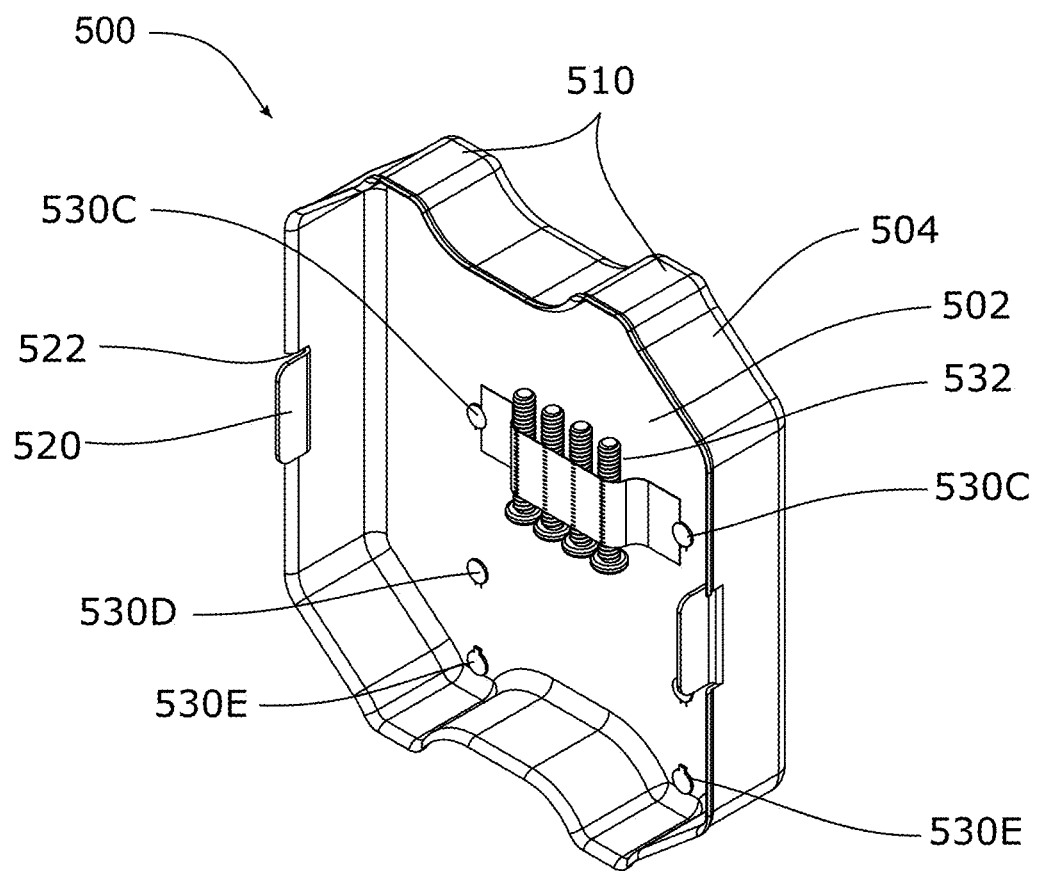
FIG. 15 is a rear perspective view of the cover of FIG. 14.

As best shown in FIGS. 14 and 15, the end walls 504 each include a pair of protrusions 510. The protrusions 510 extend from the end walls 504 away from the front wall 502 in a direction parallel to the top or bottom of the electrical device respectively. The protrusions 510 are configured to fit over the upper and lower mounting straps of an electrical device.

As best shown in FIG. 15, the side walls 506 each include a resilient tab 520 that is separated from the remainder of the wall 506 by slots 522 on each side. The tabs 520 extend from the side walls 506 toward the electrical device and also can include a portion that extends in toward the cavity. The tab 520 can be configured to engage a mud ring or junction box to form a releasable connection when installed.

In the illustrated embodiment the front wall 502 includes a series of knockouts 530A-E positioned on each side of the cover 500 that are configured to receive a fastener 532. The number and position of the knockouts 530A-E is configured to align with openings on different electrical devices. The illustrated embodiment shows an upper knockouts 530A, 530B, a central knockout 530C, and lower knockouts 530D, 530E. Fewer or more knockouts 530A-E can be provided as needed.

The knockouts 530A-E can be removed as needed by an installer and the protective cover 500 can be installed using fasteners 532 (e.g., screws) that can be included with the cover. The remaining knockouts 530A-E can stay in place, allowing the protective cover 500 to cover an electrical in a manner that prevents or reduces ingress of debris (e.g., paint, dust, etc.).

Figure 16:
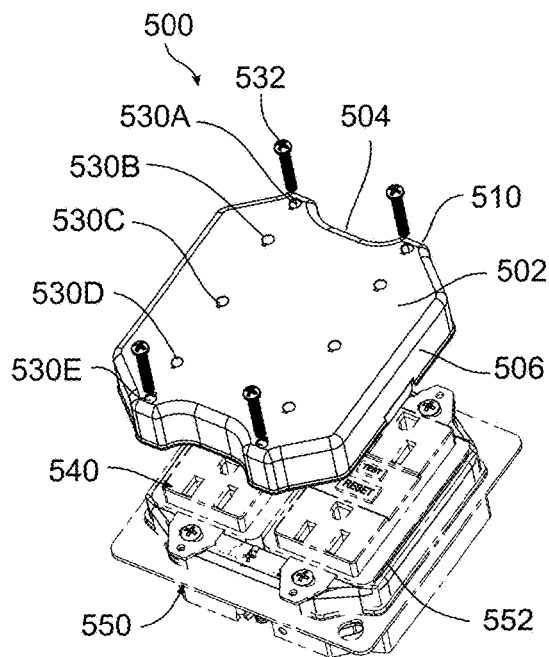
FIG. 16 is a perspective assembly view of the cover of FIG. 14 with a mud ring and GFCI outlets.
Figure 17:
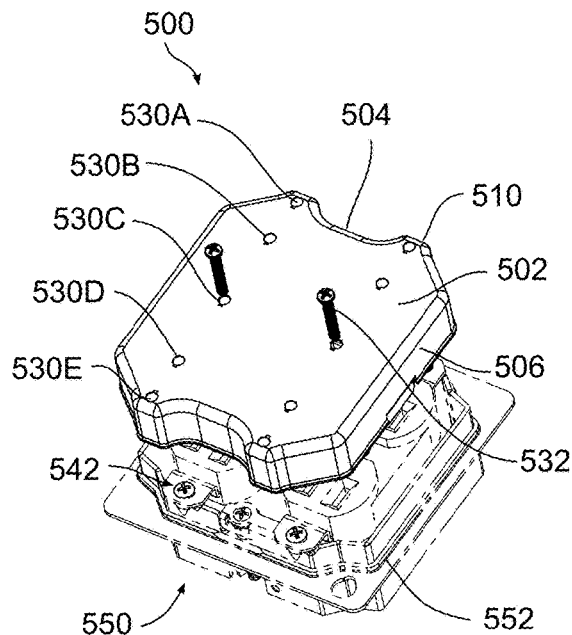
FIG. 17 is a perspective assembly view of the cover of FIG. 14 with a mud ring and duplex outlets.
Figure 18:
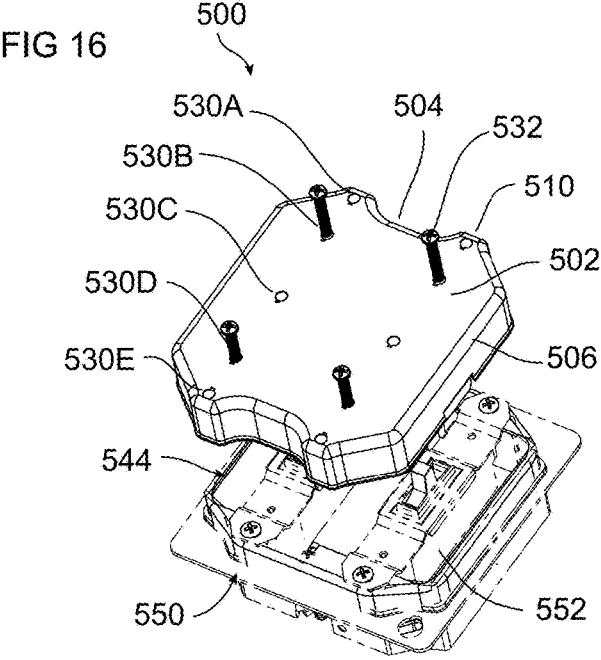
FIG. 18 is a perspective assembly view of the cover of FIG. 14 with a mud ring and rocker switches.

FIGS. 16-18 show the cover 500 used in connection with different electrical devices, and the use of different knockouts 530A-E accordingly. FIG. 16 shows the use of the cover 500 with a pair GFCI outlets 540. An upper knockout 530A and a lower knockout 530E are removed to receive the fasteners 532. The fasteners 532 extend through the cover 500 and into openings in the mounting strap of the GFCI outlet 540. FIG. 17 shows the use of the cover 500 with a pair duplex outlets 542. The central knockouts 530C are removed to receive a fastener 532. The fastener extends through the cover 500 and into a central opening in the body of the duplex outlet 542. FIG. 18 shows the use of the cover 500 with a switch 544. An upper knockout 530B and a lower knockout 530D are removed to receive the fasteners 532. The fasteners 532 extend through the cover 500 and into openings in the mounting strap of the switch 544. Different knockouts 530A-E can be removed on different sides od the cover 500 to work with a combination of devices in a two-gang box. For example, one side can contain a duplex outlet 542 and the other side can contain a switch 544, and the appropriate knockouts 530A-E can be removed accordingly.

Each of the electrical devices 540, 542, 544 is shown connected to an adjustable mud ring 550. When the cover is connected, the tabs 520 will extend into the mud ring 550 between the electrical device and an outer wall 552 of the mud ring 550. The cover 500 is also configured to be used with a regular mud ring 554 as shown in FIG. 14.

The installation procedure for the covers 400, 500 shown in FIGS. 9-18 can be performed in substantially the same manner as described above. The covers 400, 500, however, can initially be associated with a particular electrical device, such as the different outlets and switches, or combinations thereof, as described herein. The installer can then remove the correct knockouts to form one or more openings that align with one or more fastener openings on the associated electrical device. A fastener is then inserted through the opening and connected to the electrical device to secure the cover over the device. The remaining knockouts are left in place to prevent ingress of debris (e.g., paint, dust) into the electrical device.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A protective cover and mud ring assembly for an electrical device for use during construction comprising:
   a protective cover having a front wall, a pair of end walls extending from opposite sides of the front wall, a pair of side walls extending from opposite sides of the front wall, and a tab extending from each of the side walls; and
   a mud ring having a base plate and a ring extending from the base plate, the ring having an outer wall including an upper edge,
   wherein the mud ring is configured to receive an electrical device,
   wherein the protective cover is configured to connect to the mud ring and enclose the electrical device, and when the protective cover is connected to the mud ring the tabs extend between the outer wall and the electrical device below the upper edge, and
   wherein the front wall includes a series of knockouts positioned to align with fastener openings on different electrical devices, the series of knockouts including a pair of outer knockouts configured to align with openings in a GFCI mounting strap, a pair of inner knockouts configured to align with openings in a switch mounting strap, and a central opening configured to align with a central opening in a duplex outlet.

2. The protective cover and mud ring assembly of claim 1, wherein the cover is a single-gang cover.

3. The protective cover and mud ring assembly of claim 1, wherein a recess is formed in the outer wall of the mud ring, and wherein the tabs include a first protrusion extending from an interior of the tab, wherein the first protrusion is a snap-fit connection member configured to engage the recess of the mud ring.

4. The protective cover and mud ring assembly of claim 1, wherein the end walls include an outwardly extending protrusion configured to receive a mounting strap of the electrical device.

5. The protective cover and mud ring assembly of claim 4, wherein the protrusion includes a step dividing an upper portion and a lower portion, and wherein the upper portion is offset from the lower portion by approximately 0.125 inches.

6. A protective cover and mud ring assembly for an electrical device for use during construction comprising:
   a protective cover having a front wall, a pair of end walls extending from opposite sides of the front wall, a pair of side walls extending from opposite sides of the front wall, and a resilient tab extending from each of the side walls; and
   a mud ring having a base plate and a ring extending from the base plate, the ring having an outer wall including an upper edge,
   wherein the mud ring is configured to receive an electrical device,
   wherein the protective cover is configured to connect to the mud ring and enclose the electrical device, and when the protective cover is connected to the mud ring the tabs extend below the upper edge,
   wherein the resilient tab includes a first tab protrusion extending from an interior of the tab, and a second tab protrusion extending from an exterior of the tab, wherein the first tab protrusion is a snap-fit connection member configured to connect to the mud ring, and wherein the second tab protrusion defines a through opening configured to receive a tool to assist in deflecting the tab.

7. The protective cover and mud ring assembly of claim 6, wherein the front wall includes a knockout positioned to align with a fastener opening on the electrical device.

8. The protective cover and mud ring assembly of claim 6, wherein the front wall includes a central knockout, an upper knockout and a lower knockout, the knockouts configured to be selectively removable from the front wall to receive a fastener to secure the front wall to the electrical device.

9. The protective cover and mud ring assembly of claim 8, wherein the central knockout is configured to align with a fastener opening on a duplex outlet and the upper and lower knockouts are configured to align with respective openings on a GFCI outlet.

10. The protective cover and mud ring assembly of claim 6, wherein the front wall includes a protrusion configured to receive a light switch.

11. The protective cover and mud ring assembly of claim 6, wherein the through opening is configured to receive a screwdriver.

12. The protective cover and mud ring assembly of claim 6, wherein the protrusion includes a step dividing an upper portion and a lower portion, and wherein the upper portion is offset from the lower portion by approximately 0.125 inches.

13. The protective cover and mud ring assembly of claim 6, wherein the cavity is configured to enclose a single-gang outlet.

14. The protective cover and mud ring assembly of claim 6, wherein the cavity is configured to enclose a two-gang outlet.

15. The protective cover and mud ring assembly of claim 6, wherein a recess is formed in the outer wall of the mud ring for receiving the first protrusion.

16. A protective cover and mud ring assembly for an electrical device for use during construction comprising:
   a protective cover having a front wall, a pair of end walls extending from opposite sides of the front wall, a pair of side walls extending from opposite sides of the front wall, and a tab extending from each of the side walls; and
   a mud ring having a base plate and a ring extending from the base plate, the ring having an outer wall moveable relative to the base, the outer wall including an upper edge,
   wherein the mud ring is configured to receive an electrical device, wherein the protective cover is configured to connect to the mud ring and enclose the electrical device, and when the protective cover is connected to the mud ring the tabs extend between the outer wall and the electrical device below the upper edge, and wherein the front wall includes a series of knockouts positioned to align with fastener openings on different electrical devices, the series of knockouts including a pair of outer knockouts configured to align with openings in a GFCI mounting strap, a pair of inner knockouts configured to align with openings in a switch mounting strap, and a central opening configured to align with a central opening in a duplex outlet.

17. The protective cover and mud ring assembly of claim 16, wherein the front wall includes a series of knockouts positioned to align with fastener openings on different electrical devices.

18. The protective cover and mud ring assembly of claim 16, wherein a recess is formed in the outer wall of the mud ring, and wherein the tabs include a first protrusion extending from an interior of the tab, wherein the first protrusion is a snap-fit connection member configured to engage the recess of the mud ring.

19. The protective cover and mud ring assembly of claim 16, wherein the end walls include an outwardly extending protrusion configured to receive a mounting strap of the electrical device.

20. The protective cover and mud ring assembly of claim 16, wherein the ring is moveably connected to the base by an indexing screw.

* * * * *